Nov. 22, 1938.          J. J. HEBOR          2,137,340
                          TAP
                    Filed Aug. 9, 1937
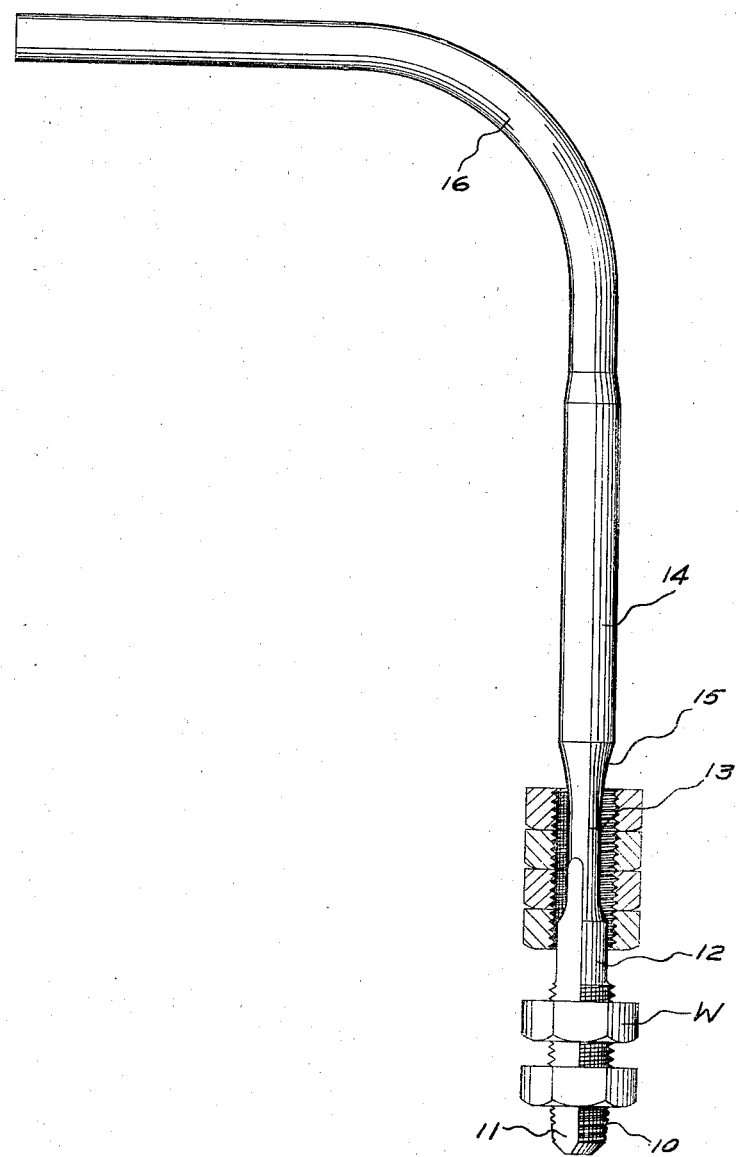
INVENTOR
JOHN J. HEBOR
BY
ATTORNEY Patented Nov. 22, 1938

2,137,340

UNITED STATES PATENT OFFICE 2,137,340

TAP

John J. Hebor, Euclid, Ohio, assignor to Niles-Bement-Pond Company, Hartford, Conn., a corporation of New Jersey Application August 9, 1937, Serial No. 158,028

3 Claims. (Cl. 10—141)

This invention relates to taps and particularly to taps adapted for high speed tapping machines and having an elongated bent shank over which the threaded members may pass.

More particularly the invention relates to a tap of the so-called tapper type having means to facilitate breaking up and removal of the chips from the members being threaded to prevent the chips becoming wedged between portions of the tap and members, thus causing breakage of the taps.

A feature enabling the above object to be accomplished is that the tap above its threaded cutting portion is provided with a short guiding portion through which the flutes of the threaded portion extend and which closely fits the open diameter of the members being threaded, there being a neck portion adjacent the guiding portion into which the flutes of the guiding portion extend substantially reduced in diameter from the guiding portion and extending for a material length of the shank and gradually merging by means of a conical section into an upper shank portion closely fitting the open diameter of the threads formed by the tap.

The drawing shows one preferred form of tapper tap in which the improved form of shank is illustrated.

Referring more in detail to the figure of the drawing, a tap is shown having a threaded portion 10 of conventional form, there being longitudinally extending flutes of the usual type, three or four of these flutes 11 being provided depending upon the size of the members W being threaded. Above the threaded or cutting portion 10 of the tap is a guiding portion 12 having a diameter substantially equal to the diameter of the opening through the completely threaded member W so that the members, after leaving the cutting portion 10, will be substantially guided by contact with this guiding portion. The flutes 11 of the threaded cutting portion 10 of the tap extend completely through this guiding portion 12.

Above the guiding portion 12 of the tap is a neck portion 13 of materially reduced diameter from that of the guiding portion 12 and into which the ends of the flutes 11 gradually run out. This neck portion 13 is cylindrical substantially throughout its length and is materially longer than the guiding portion 12 so that a small number of threaded members W may surround this portion of reduced diameter during operation. The guiding portion 12 merges into the neck portion by means of a short conical portion. The upper end of this necked portion 13 merges into the upper shank portion 14 having a diameter substantially equal to the guiding portion 12 by an elongated conical section 15 gradually increasing in diameter. The upper end of the shank 16 beyond the portion 14 may be of any conventional form, that shown being one of the conventional forms of tapper taps used in high speed tapping machines.

In operation the tap is used in the usual manner, each threaded member W being tapped in the usual manner and allowed to pass gradually up the shank of the tap and off its upper bent end as successive members are threaded. As the threaded members W leave the cutting portion 10 they are maintained in position with their axes coaxial with the axis of the cutting portion of the tap as they pass up the guiding portion 12 until successive threaded members force them still further upward over the reduced diameter or neck portion 13 of the shank. Chips which are formed in the threading operation and which become wedged in the flutes 11 are allowed ample free space at the upper end of the guiding portion 12 to pass out within the space between the diameter of the necked portion 13 and the threaded portions of the threaded members. As there is an open space formed by the flutes for these chips after the threaded members have left the cutting portion of the taps and as the flutes extend into the neck portion, no opportunity is given the chips to clog the action of the tap and prevent movement of the threaded members W to pass freely upward over the shank of the tap. As soon as the threaded members reach the neck portion 13 the diameter of which is sufficiently reduced to provide open ends for the flutes 11, ample space is provided for the chips between the opening or hole through the threaded members and the surface of the neck portion 13.

While passing upward over this neck portion 13 the threaded members W are permitted lateral movement which serves to clear the space within the threaded members of chips and facilitates breaking up of chips of elongated form.

After passing upward along the neck portion 13 the threaded members W are gradually guided on to the shank portion 14 by means of the gradually increasing diameter of the tapered portion 15.

What I claim is:

1. A tap of the character described having a threaded cutting portion at one end, a short fluted cylindrical guiding portion adjacent said cutting portion, an elongated portion adjacent said guiding portion of materially reduced diameter and into which said flutes extend, and a shank adjacent said reduced diameter portion of substantially the same diameter as said guiding portion.

2. A tap of the character described having a fluted threaded portion, a short fluted cylindrical portion adjacent said threaded portion over which the threaded members may pass, a cylindrical portion having a diameter materially reduced from and into which the flutes of said fluted cylindrical portion extend, and a shank extending from said reduced portion having a diameter substantially equal to that of the fluted cylindrical portion.

3. A tap of the character described having a threaded cutting portion at one end, a short fluted cylindrical guiding portion adjacent said cutting portion, an elongated cylindrical portion adjacent said guiding portion of materially reduced diameter and into which the flutes of said fluted cylindrical portion extend, and a shank adjacent said reduced diameter portion of substantially the same diameter as said guiding portion, the connection between the elongated cylindrical portion and the shank being conical of gradually increasing diameter.

JOHN J. HEBOR.